United States Patent
Oishi

(10) Patent No.: US 10,450,169 B2
(45) Date of Patent: Oct. 22, 2019

(54) SURROUNDING DISPLAY DEVICE FOR TRAVELING CRANE

(71) Applicant: TADANO LTD., Kagawa (JP)

(72) Inventor: Takayuki Oishi, Kagawa (JP)

(73) Assignee: TADANO LTD., Kagawa (JP)

( * ) Notice: Subject to any disclaimer, the term of this patent is extended or adjusted under 35 U.S.C. 154(b) by 27 days.

(21) Appl. No.: 15/574,643

(22) PCT Filed: Jun. 6, 2016

(86) PCT No.: PCT/JP2016/066719
§ 371 (c)(1),
(2) Date: Nov. 16, 2017

(87) PCT Pub. No.: WO2017/038183
PCT Pub. Date: Mar. 9, 2017

(65) Prior Publication Data
US 2018/0134527 A1    May 17, 2018

(30) Foreign Application Priority Data

Sep. 1, 2015    (JP) .................................. 2015-171985

(51) Int. Cl.
*B66C 13/16*    (2006.01)
*B60R 1/00*    (2006.01)
(Continued)

(52) U.S. Cl.
CPC ................. *B66C 13/16* (2013.01); *B60R 1/00* (2013.01); *B66C 13/46* (2013.01); *B66C 23/88* (2013.01);
(Continued)

(58) Field of Classification Search
CPC ......... B66C 13/16; B66C 23/88; B66C 13/46; H04N 5/23293; H04N 5/247; B60R 1/00;
(Continued)

(56) References Cited

U.S. PATENT DOCUMENTS

2002/0110262 A1    8/2002 Iida et al.
2003/0230414 A1*    12/2003 Peltola .................. A62C 27/00
                                                                       169/47
(Continued)

FOREIGN PATENT DOCUMENTS

CN        1371079 A      9/2002
CN     102862915 A      1/2013
(Continued)

OTHER PUBLICATIONS

Aug. 30, 2016, International Search Report issued for related international application No. PCT/JP2016/066719.
(Continued)

*Primary Examiner* — Marnie A Matt
(74) *Attorney, Agent, or Firm* — Paratus Law Group, PLLC

(57) ABSTRACT

Provided is a surrounding display device for a traveling crane, whereby the positional relationship between surrounding objects and a boom can be easily understood. This surrounding display device (A) is for a traveling crane (100) equipped with a traveling vehicle body (101) and a boom (105), the surrounding display device (A) being equipped with: cameras (1L), (1R) provided to the leading end of the boom (105); a control device (2) connected to the cameras (1L), (1R); and a monitor (3) connected to the control device (2). The control device (2) superimposes the positional information of the boom (105) on the images photographed with the cameras (1L), (1R) and displays the result on the monitor (3). Thus, the positional relationship between surrounding objects and the boom (105) can be easily understood.

12 Claims, 7 Drawing Sheets

(51) Int. Cl.
*H04N 5/232* (2006.01)
*B66C 13/46* (2006.01)
*B66C 23/88* (2006.01)
*H04N 5/247* (2006.01)

(52) U.S. Cl.
CPC .... *H04N 5/23293* (2013.01); *B60R 2300/105* (2013.01); *B60R 2300/304* (2013.01); *B60R 2300/305* (2013.01); *B60R 2300/60* (2013.01); *H04N 5/247* (2013.01)

(58) Field of Classification Search
CPC ........ B60R 2300/305; B60R 2300/304; B60R 2300/60; B60R 2300/105
USPC .......................................................... 348/148
See application file for complete search history.

(56) References Cited

U.S. PATENT DOCUMENTS

| | | | | |
|---|---|---|---|---|
| 2005/0135915 | A1* | 6/2005 | Hall | B66C 1/427 |
| | | | | 414/739 |
| 2008/0309784 | A1* | 12/2008 | Asari | B60R 1/00 |
| | | | | 348/222.1 |
| 2013/0013144 | A1* | 1/2013 | Tanizumi | B66C 23/905 |
| | | | | 701/34.4 |
| 2015/0138356 | A1 | 5/2015 | Kowatari et al. | |
| 2015/0334345 | A1* | 11/2015 | Fichera | B60R 11/02 |
| | | | | 348/14.01 |
| 2018/0080198 | A1* | 3/2018 | Machida | E02F 9/16 |

FOREIGN PATENT DOCUMENTS

| | | |
|---|---|---|
| JP | S59-139788 U | 9/1984 |
| JP | S60-012490 A | 1/1985 |
| JP | H03-094341 U | 9/1991 |
| JP | 2013-018580 A | 1/2013 |
| JP | 2013-113044 A | 6/2013 |
| WO | WO 2013/183674 A1 | 12/2013 |

OTHER PUBLICATIONS

Aug. 30, 2016, International Search Opinion issued for related international application No. PCT/JP2016/066719.

* cited by examiner

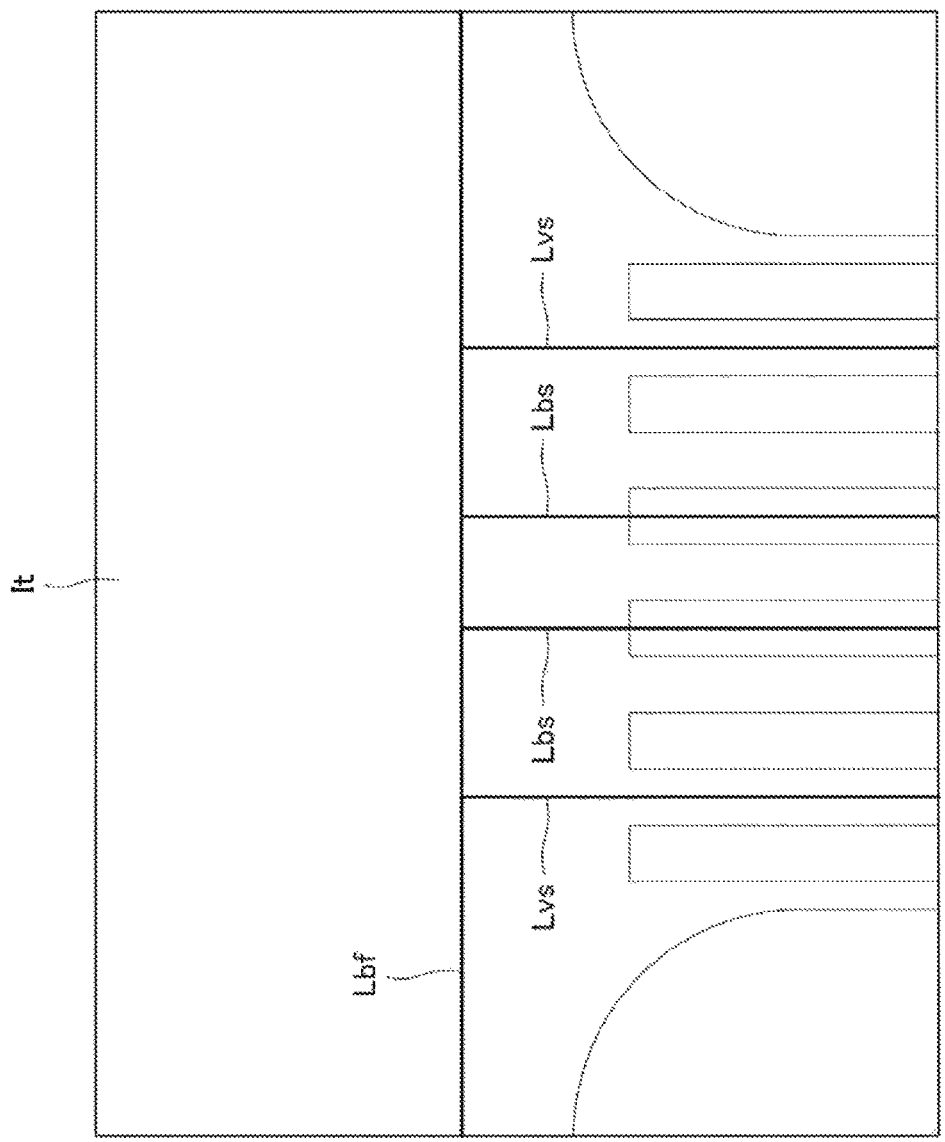

SURROUNDING DISPLAY DEVICE FOR TRAVELING CRANE

CROSS REFERENCE TO PRIOR APPLICATION

This application is a National Stage Patent Application of PCT International Patent Application No. PCT/JP2016/066719 (filed on Jun. 6, 2016) under 35 U.S.C. § 371, which claims priority to Japanese Patent Application No. 2015-171985 (filed on Sep. 1, 2015), which are all hereby incorporated by reference in their entirety.

TECHNICAL FIELD

The present invention relates to a surroundings display apparatus for a mobile crane. More specifically, the present invention relates to a surroundings display apparatus for confirming the surroundings of a boom leading end portion of a mobile crane in an operator cab.

BACKGROUND ART

A mobile crane includes a traveling vehicle body, a slewing base loaded onto a traveling vehicle body, a boom mounted on the slewing base so as to freely perform derricking, and an operator cab provided in the slewing base. During vehicle travel, in which a mobile crane is travelling on an ordinary road, the mobile crane is in a storage state where the boom is contracted and collapsed. In the storage state of the boom, a boom leading end portion protrudes forward from a front end of the traveling vehicle body. Therefore, it is difficult for a worker in the operator cab to confirm the surroundings of the boom leading end portion, particularly sideways.

For example, when the mobile crane enters an intersection, the boom leading end portion enters the intersection earlier than the operator cab. At this time point, it is difficult for the worker in the operator cab to confirm a situation of crossing roads.

PTL 1 discloses a sideways visual recognition apparatus including a camera provided in a boom leading end portion in a state of facing sideways, and a monitor that is provided in an operator cab and displays an image photographed with this camera. In a case of this sideways visual recognition apparatus, even when the operator cab does not enter an intersection, a situation of crossing roads can be confirmed at a time point when the boom leading end portion enters the intersection. Therefore, safety is improved during vehicle travel.

CITATION LIST

Patent Literature

PTL 1
Japanese Utility Model (Registration) Application Laid-Open No. 3-94341

SUMMARY OF INVENTION

Technical Problem

However, the above sideways visual recognition apparatus merely displays an image photographed with the camera on the monitor. Therefore, there is a problem in that positional relationship between a surrounding object such as a road surface and a vehicle displayed on the monitor, and a boom is difficult to be understood.

The present invention has been made in view of the above circumferences, and an object of the present invention is to provide a surroundings display apparatus for a mobile crane in which positional relationship between a surrounding object and a boom is easily understood.

Solution to Problem

A surroundings display apparatus for a mobile crane of a first invention is a surroundings display apparatus for a mobile crane including a traveling vehicle body, and a boom, the surroundings display apparatus for a mobile crane further including: a camera that is provided in a leading end portion of the boom; a control apparatus that is connected to the camera; and a monitor that is connected to the control apparatus, in which the control apparatus overlaps positional information of the boom on an image photographed with the camera to display the positional information on the monitor.

According to a surroundings display apparatus for a mobile crane of a second invention, in the first invention, the positional information of the boom is a line that indicates a leading end position of the boom.

According to a surroundings display apparatus for a mobile crane of a third invention, in the first invention, the positional information of the boom is a line that indicates a side surface position of the boom.

According to a surroundings display apparatus for a mobile crane of a fourth invention, in the first invention, the positional information of the boom is a silhouette of a projection of the leading end portion of the boom.

According to a surroundings display apparatus for a mobile crane of a fifth invention, in the first, second, third or fourth invention, the control apparatus overlaps positional information of the traveling vehicle body on the image photographed with the camera to display the positional information on the monitor.

According to a surroundings display apparatus for a mobile crane of a sixth invention, in the fifth invention, the positional information of the traveling vehicle body is a line that indicates a side surface position of the traveling vehicle body.

According to a surroundings display apparatus for a mobile crane of a seventh invention, in the first, second, third or fourth invention, the control apparatus performs a viewpoint conversion process on the image photographed with the camera to generate a viewpoint-converted image as viewed immediately sideways from the leading end portion of the boom, and overlaps the positional information of the boom on the viewpoint-converted image to display the positional information on the monitor.

According to a surroundings display apparatus for a mobile crane of an eighth invention, in the first, second, third or fourth invention, the control apparatus performs a viewpoint conversion process on the image photographed with the camera to generate a viewpoint-converted image as viewed immediately downward from the leading end portion of the boom, and overlaps the positional information of the boom on the viewpoint-converted image to display the positional information on the monitor.

According to a surroundings display apparatus for a mobile crane of a ninth invention, in the first, second, third, fourth, fifth, sixth, seventh or eighth invention, the camera is composed of a right camera provided in the leading end portion of the boom so as to face toward a right side, and a left camera provided in the leading end portion of the boom so as to face toward a left side, and the control apparatus displays respective images photographed with the right camera and the left camera on the monitor.

Advantageous Effects of Invention

According to the first invention, the positional information of the boom is overlapped on the image photographed with the camera to be displayed, and therefore positional relationship between a surrounding object and the boom is easily understood.

According to the second invention, the line that indicates the leading end position of the boom is overlapped on the image photographed with the camera to be displayed, and therefore positional relationship between a surrounding object and the boom leading end portion is easily understood.

According to the third invention, the line that indicates the side surface position of the boom is overlapped on the image photographed with the camera to be displayed, and therefore positional relationship between a surrounding object and the boom side surface is easily understood.

According to the fourth invention, the silhouette of a projection of the leading end portion of the boom is overlapped on the image photographed with the camera to be displayed, and therefore positional relationship between a surrounding object and the boom leading end portion is easily understood.

According to the fifth invention, the positional information of the traveling vehicle body is overlapped on the image photographed with the camera to be displayed, and therefore positional relationship between a surrounding object and the traveling vehicle body is easily understood.

According to the sixth invention, the line that indicates the side surface position of the traveling vehicle body is overlapped on the image photographed with the camera to be displayed, and therefore positional relationship between a surrounding object and the traveling vehicle body side surface is easily understood.

According to the seventh invention, the viewpoint-converted image as viewed immediately sideways from the leading end portion of the boom is displayed, and therefore a degree of protrusion of the boom leading end portion with respect to a lateral object is easily understood.

According to the eighth invention, the viewpoint-converted image as viewed immediately downward from the leading end portion of the boom is displayed, and therefore a degree of protrusion of the boom leading end portion with respect to a lower object is easily understood.

According to the ninth invention, the respective images photographed with the left and right cameras are displayed, and therefore it is possible to confirm both sides of the boom leading end portion at the same time.

BRIEF DESCRIPTION OF DRAWINGS

FIG. 7 is an image displayed on monitor 3 in Embodiment 4.

DESCRIPTION OF EMBODIMENTS

Figure 1:
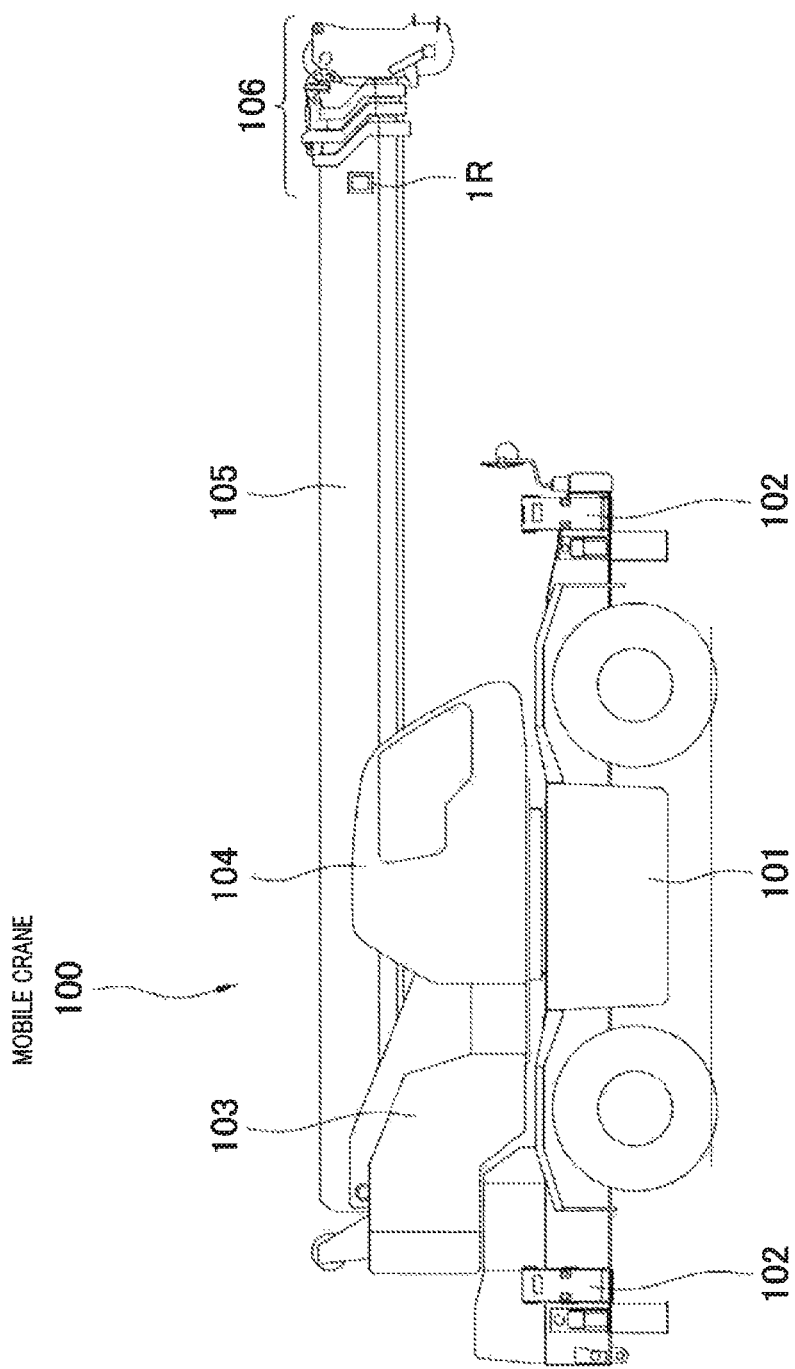
FIG. 1 is a side view of a mobile crane 100.

Now, embodiments of the present invention will be described with reference to the accompanying drawings.

Embodiment 1

(Mobile Crane 100)
First, a basic configuration of mobile crane 100 will be described with reference to FIG. 1 and FIG. 2.

Reference numeral 101 in the drawings denotes a traveling vehicle body. In traveling vehicle body 101, outriggers 102 that ensure stability during crane operation are provided, in addition to an engine, wheels for vehicle travelling. Slewing base 103 is loaded on an upper surface of traveling vehicle body 101. Slewing base 103 can slew at 360° in a horizontal plane by a slewing motor. On slewing base 103, operator cab 104 is provided.

On slewing base 103, boom 105 is mounted so as to freely perform derricking. A base end portion of boom 105 is pivotally supported on slewing base 103 by a pin. A derricking cylinder is mounted between boom 105 and slewing base 103. When this derricking cylinder is extended, boom 105 rises, and when the derricking cylinder is contracted, the boom 105 collapses.

Boom 105 is a multistage boom in a telescopic form. Boom 105 has a base end boom, one or a plurality of intermediate booms, and a leading end boom. Boom 105 is extended/contracted by an extensible cylinder. The number of stages of boom 105 is not particularly limited. Boom 105 may have a two-stage configuration with no intermediate boom, or may have a three or more-stage configuration with one or more intermediate boom.

A wire rope including a hook (not illustrated) is suspended from a leading end portion of boom 105 (leading end boom). The wire rope is guided up to slewing base 103 along boom 105 to be wound by a winch. The winch is driven by a hoist motor to rotate normally and reversely. In accordance with the direction of rotation of the winch, winding and delivery of the wire rope are switched. When the wire rope is wound, the hook rises, and when the wire rope is delivered, the hook lowers.

During crane operation, outriggers 102 are extended, so that the stability of traveling vehicle body 101 is ensured. Slewing of slewing base 104, derricking and extending/contracting of boom 105, rising and lowering of the hook are combined, so that loading and unloading in a three-dimensional space is possible.

During vehicle travel, outriggers 102 and boom 105 are each in a storage state. In the storage state of boom 105, boom 105 is in a fully contracted state and in a fully collapsed state. In the storage state of boom 105, boom leading end portion 106 is in a state of slewing in front of traveling vehicle body 101. In the storage state of boom 105, boom leading end portion 106 protrudes forward from a front end of traveling vehicle body 101. The worker drives in operator cab 104. Therefore, it is difficult for the worker in operator cab 104 to confirm the surroundings of boom leading end portion 106, particularly sideways.

In this specification, the front-back direction of traveling vehicle body 101 in plan view (FIG. 2) of mobile crane 100 is referred to as the "front-back direction", and the right and left direction of traveling vehicle body 101 is referred to as the "width direction". Additionally, a position in the front-back direction of the leading end of boom 105 is referred to as "boom leading end position BF". A position in the width direction of each side surface of boom 105 is referred to as "boom side surface position BS". A distance between right and left boom side surface positions BS, BS means the width of boom 105. A position in the width direction of each side surface of traveling vehicle body 101 is referred to as "traveling vehicle body side surface position VS". A distance between the right and left traveling vehicle body side surface positions VS, VS means the vehicle width of traveling vehicle body 101.

(Surroundings Display Apparatus A)

Now, surroundings display apparatus A according to Embodiment 1 of the present invention will be described.

Figure 3:
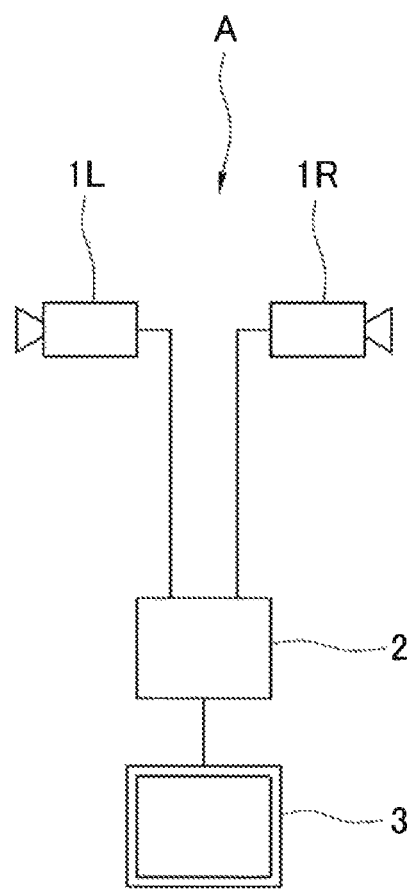
FIG. 3 is a block diagram of a surroundings display apparatus A according to Embodiment 1 of the present invention.

As illustrated in FIG. 3, surroundings display apparatus A has two cameras 1L, 1R, control apparatus 2, and monitor 3. Control apparatus 2 is connected to cameras 1L, 1R. Monitor 3 is connected to control apparatus 2.

Figure 2:
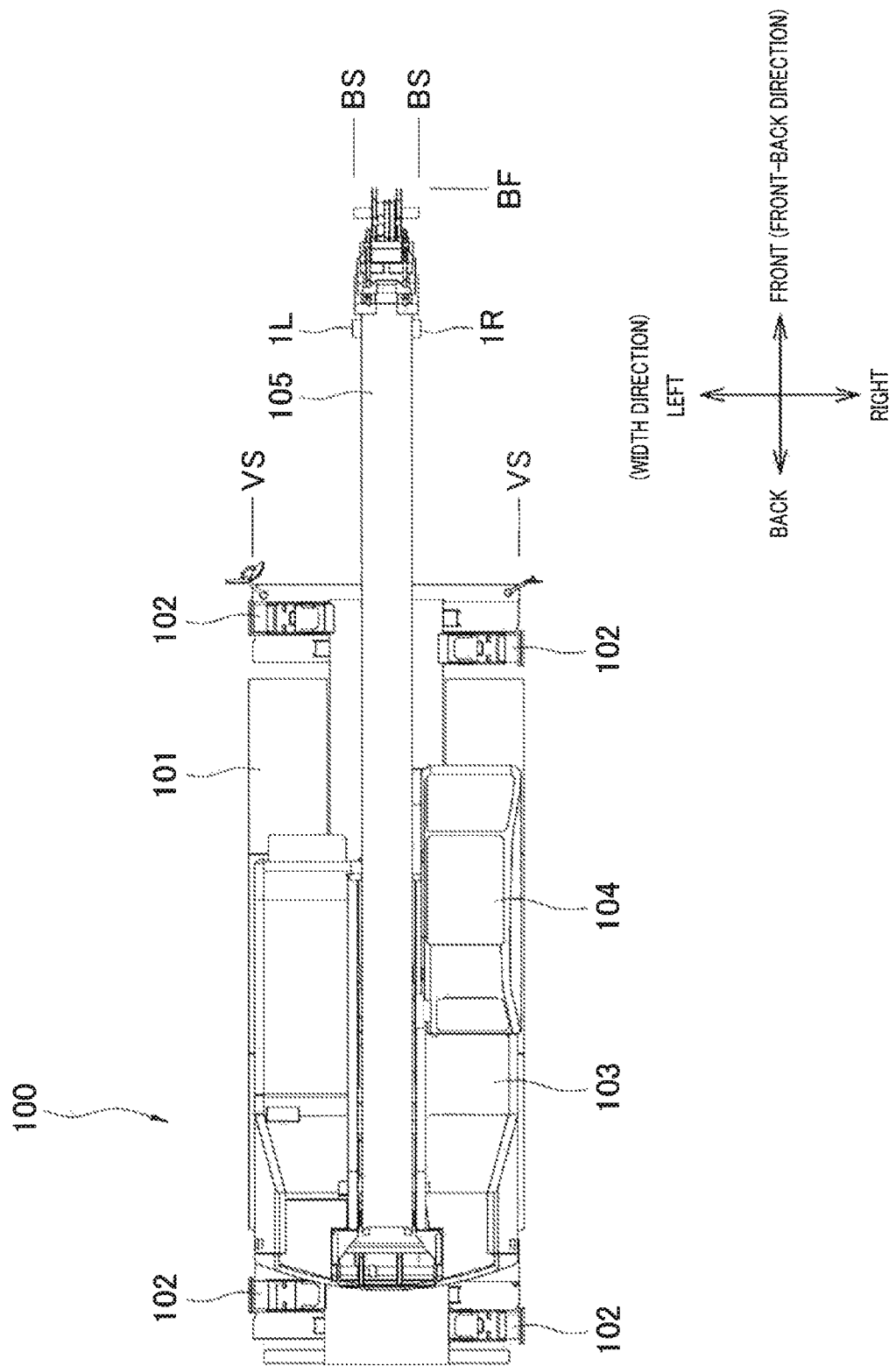
FIG. 2 is a plan view of the mobile crane 100.

Cameras 1L, 1R are provided on the left and right sides of boom leading end portion 106 (refer to FIG. 1 and FIG. 2). Camera 1R is provided so as to face toward the right side from boom leading end portion 106. Camera 1R is referred to as right camera 1R. Camera 1L is provided so as to face toward the left side. Camera 1L is referred to as left camera 1L.

Cameras 1L, 1R only need to be arranged in leading end portion 106 of fully contracted booms 105. Cameras 1L, 1R may be provided in a leading end portion of the base end boom, or may be provided in a leading end portion of the leading end boom. Additionally, the directions of cameras 1L, 1R (directions of optical axes) are not particularly limited. Cameras 1L, 1R may preferably face toward the obliquely front side and obliquely lower side from boom leading end portion 106.

Control apparatus 2 is composed of a computer including a CPU and a memory. Control apparatus 2 has a function of processing images photographed with cameras 1L, 1R to display the processed images on monitor 3. The details thereof will be described below. Control apparatus 2 and monitor 3 are installed on operator cab 104.

(Monitor Display Image)

Now, images displayed on monitor 3 will be described.

Figure 4:
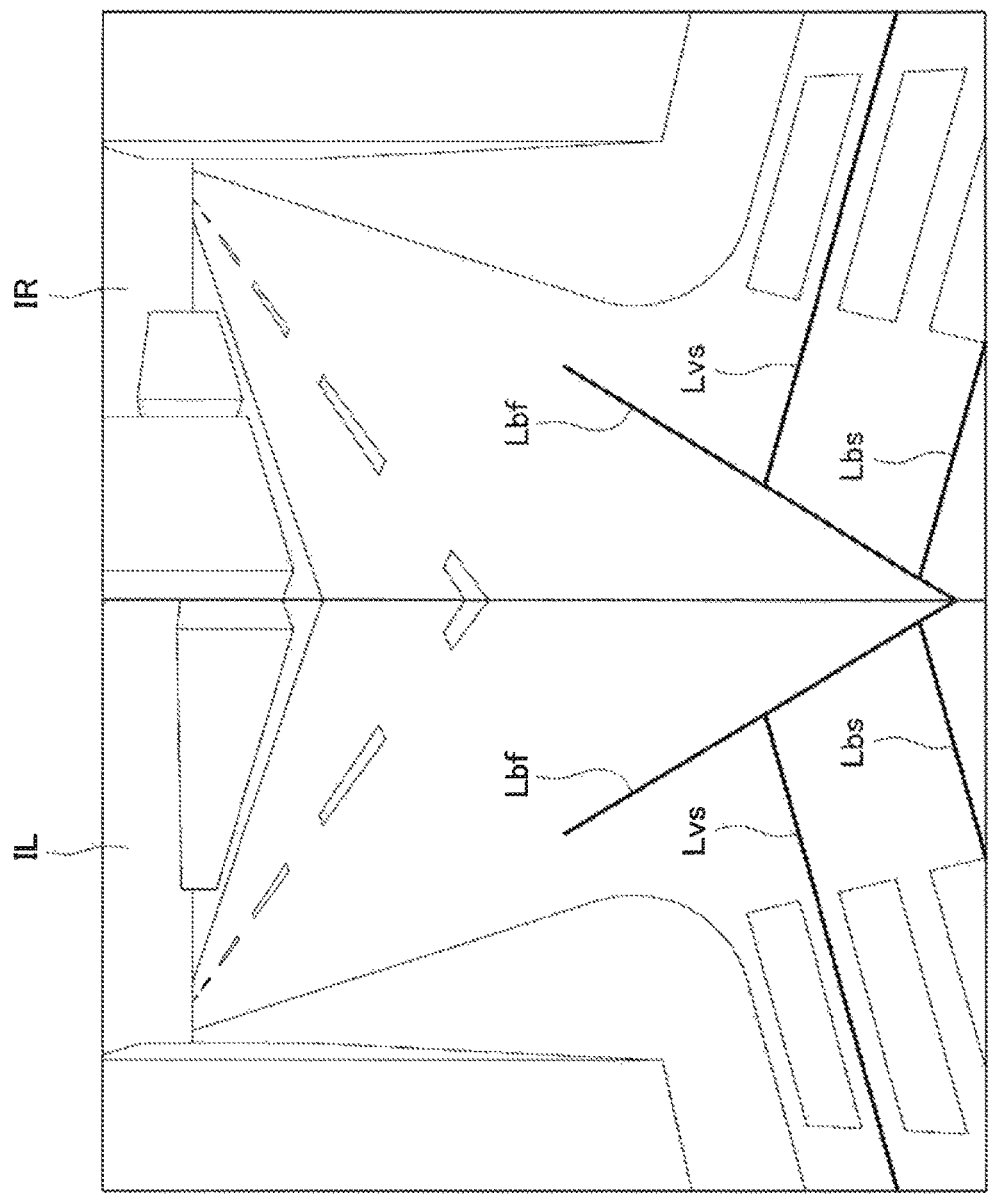
FIG. 4 is an image displayed on monitor 3 in Embodiment 1.

Control apparatus 2 processes respective images photographed with cameras 1L, 1R to generate images illustrated in FIG. 4. Control apparatus 2 displays the generated images on monitor 3. The background of the images illustrated in FIG. 4 is exemplification in which a scene where mobile crane 100 enters an intersection is assumed.

As illustrated in FIG. 4, in monitor 3, a screen is divided into two at the center. In a right area of monitor 3, right image IR photographed with right camera 1R is displayed. On the other hand, in a left area of monitor 3, left image IL photographed with left camera 1L is displayed.

Thus, images IL, IR photographed with left and right cameras 1L, 1R are displayed on one monitor 3, and therefore the worker can confirm both the left and right sides of boom leading end portion 106 at the same time.

Positional information of boom 105 is overlapped to be displayed on each of images IL, IR. The positional information of boom 105 in this embodiment is boom leading end line Lbf that indicates boom leading end position BF, and boom side surface lines Lbs that indicate boom side surface positions BS. Boom leading end line Lbf is a line obtained by projecting boom leading end position BF on a road surface to extend in the width direction. Boom side surface lines Lbs each are a line obtained by projecting boom side surface position BS on the road surface to extend in the front-back direction.

On each of images IL, IR, positional information of traveling vehicle body 101 is overlapped to be displayed. The positional information of traveling vehicle body 101 in this embodiment is traveling vehicle body side surface lines Lvs that indicate traveling vehicle body side surface positions VS. Traveling vehicle body side surface lines Lvs each are a line obtained by projecting traveling vehicle body side surface position VS on the road surface to extend in the front-back direction.

In the memory of control apparatus 2, respective positions on the images of lines Lbs, Lbf, Lvs (for example, position coordinates of endpoints of segments) are previously stored. Control apparatus 2 overlaps lines Lbs, Lbf, Lvs on each of images IL, IR on the basis of the information to display lines Lbs, Lbf, Lvs.

The positions of the endpoints of the segments which represent lines Lbs, Lbf, Lvs, and the lengths of the segment are not particularly limited. In the example illustrated in FIG. 4, boom leading end line Lbf is a segment longer than the vehicle width of traveling vehicle body 101. On the other hand, boom side surface lines Lbs and traveling vehicle body side surface lines Lvs each are a segment extending from the endpoint positioned on boom leading end line Lbf to the back of traveling vehicle body 101.

When lines Lbs, Lbf, Lvs are displayed in different colors or line types, lines Lbs, Lbf, Lvs are easily distinguished, which is preferable. Additionally, lines Lbs, Lbf, Lvs may be displayed in straight lines, or may be displayed in curved lines matching distortion of lenses of cameras 1L, 1R.

Boom leading end line Lbf is overlapped on each of images IL, IR to be displayed, and therefore the worker easily understands positional relationship between a surrounding object such as a road surface and a vehicle, and the boom leading end portion. Additionally, boom side surface lines Lbs are overlapped on images IL, IR to be displayed, and therefore the worker easily understands positional relationship between the surrounding object and the boom side surfaces.

For example, when mobile crane 100 enters an intersection, positional relationship between the surrounding object such as the road surface and the vehicle displayed on monitor 3, and boom 105 are easily understood. Even when operator cab 104 does not enter the intersection, a situation of crossing roads can be confirmed at a time point when boom leading end portion 106 enters the intersection. Therefore, safety is improved during vehicle travel.

When mobile crane 100 is made to advance up to a position very close to a wall, a distance between boom leading end portion 106 and a wall is easily understood. Also in such a case, safety is improved.

Respective traveling vehicle body side surface lines Lvs are overlapped on images IL, IR to be displayed, and therefore the worker easily understands positional relationship between the surrounding object and traveling vehicle body side surfaces. Particularly, relation between the surrounding object and the vehicle width is easily understood. Therefore, for example, entering to a narrow road is facilitated.

In this embodiment, boom leading end line Lbf, boom side surface line Lbs, traveling vehicle body side surface line Lvs are all displayed. However, one or two of these may be displayed.

Embodiment 2

Figure 5:
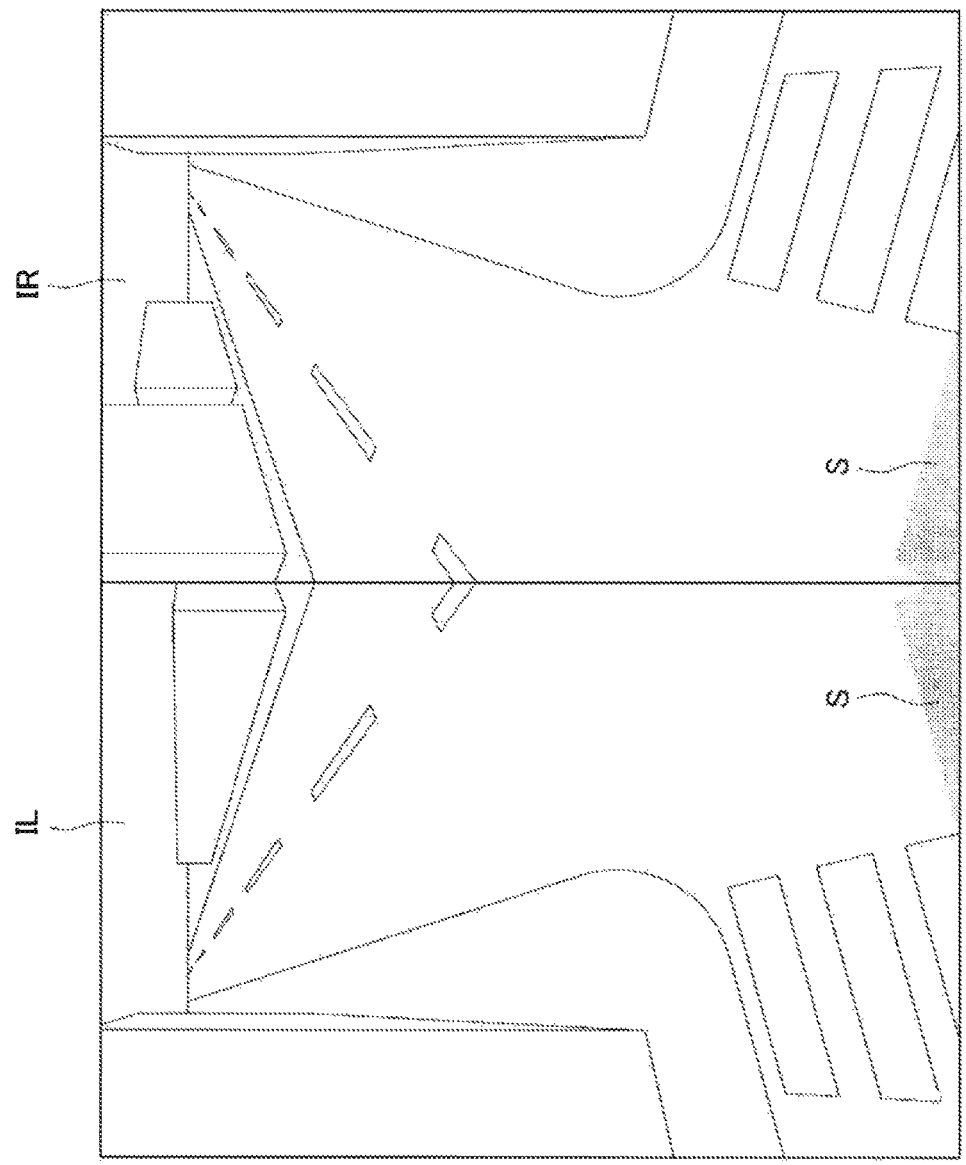
FIG. 5 is an image displayed on monitor 3 in Embodiment 2.

A configuration in which images illustrated in FIG. 5 are displayed on monitor 3 may be employed.

In this embodiment, silhouette S obtained by projecting boom leading end portion 106 on a road surface is overlapped on each of images IL, IR to be displayed. That is, positional information of boom 105 in this embodiment is silhouettes S of boom leading end portion 106. Silhouettes S are each obtained by filling an area surrounded by boom leading end line Lbf and boom side surface line Lbs in Embodiment 1.

In a memory of control apparatus 2, areas on the images of silhouettes S are previously stored. Control apparatus 2 overlaps respective silhouettes S on images IL, IR on the basis of the information to display silhouettes S. Color and transmittance of each silhouette S, and kinds of hatching are not particularly limited.

Silhouettes S of boom leading end portion 106 are overlapped on images IL, IR to be displayed, and therefore a worker easily understands positional relationship between a surrounding object and boom leading end portion 106.

Embodiment 3

Figure 6:
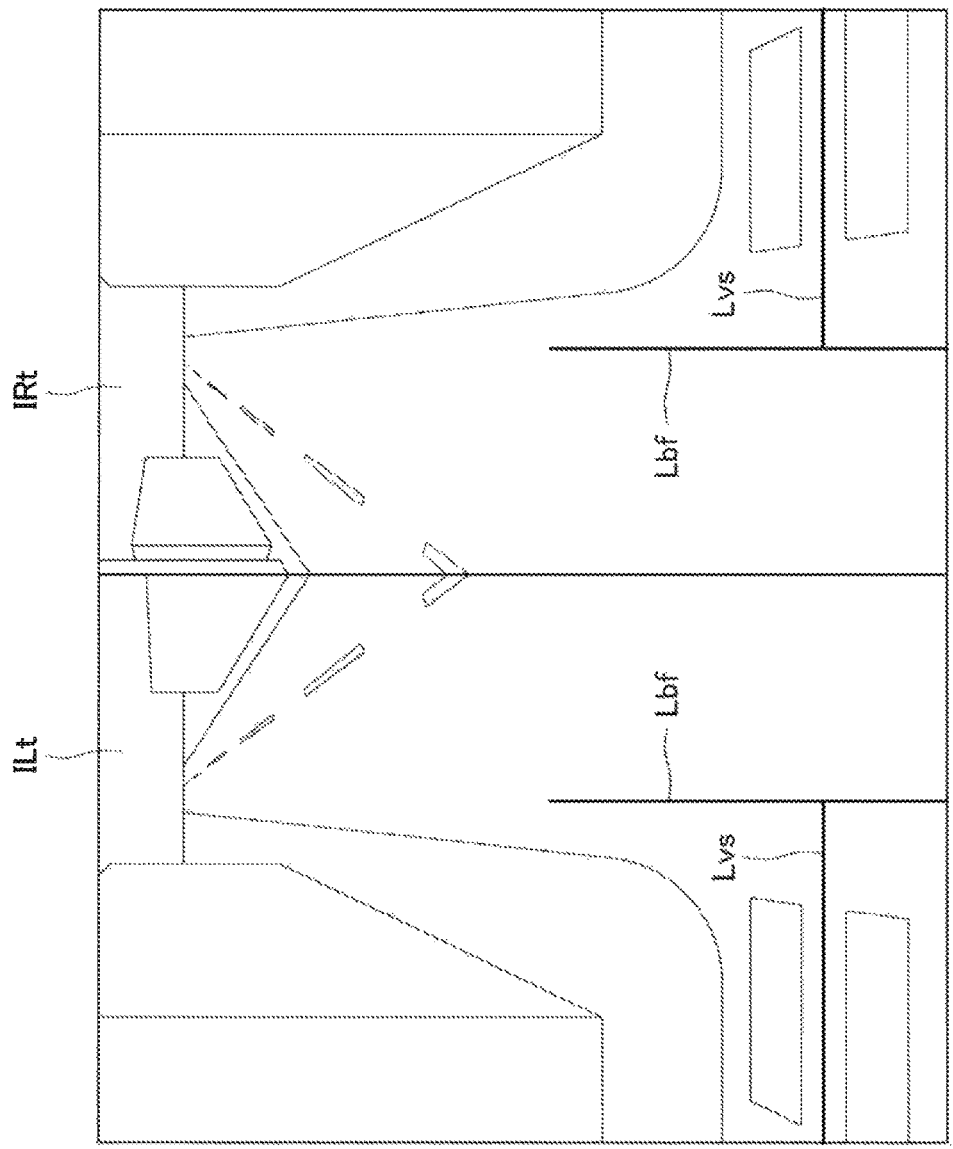
FIG. 6 is an image displayed on monitor 3 in Embodiment 3.

A configuration in which images illustrated in FIG. 6 are displayed on monitor 3 may be employed.

Control apparatus 2 of this embodiment performs viewpoint conversion processes for images IL, IR photographed with cameras 1L, 1R to generate viewpoint-converted images ILt, IRt as viewed immediately sideways from a leading end of boom 105. A known method can be used for the viewpoint conversion process.

As illustrated in FIG. 6, monitor 3 is divided into two at the center. In a right area of monitor 3, right viewpoint-converted image IRt obtained by performing the viewpoint conversion process on right image IR is displayed. On the other hand, in a left area of monitor 3, left viewpoint-converted image ILt obtained by performing the viewpoint conversion process on left image IL is displayed.

Control apparatus 2 overlaps positional information of boom 105 on viewpoint-converted images IRt, ILt to display the positional information. The positional information of boom 105 in this embodiment is boom leading end line Lbf that indicates boom leading end position BF.

In each of viewpoint-converted images IRt, ILt, boom leading end line Lbf is displayed as a vertical line. Therefore, compared to a case where boom leading end line Lbf is displayed as an inclined line, a degree of protrusion of boom leading end portion 106 with respect to a lateral object is easily understood.

Control apparatus 2 overlaps positional information of traveling vehicle body 101 on viewpoint-converted images IRt, ILt to display the positional information. The positional information of traveling vehicle body 101 in this embodiment is traveling vehicle body side surface lines Lvs that indicate traveling vehicle body side surface positions VS.

In each of viewpoint-converted images IRt, ILt, traveling vehicle body side surface lines Lvs is displayed as a horizontal line. Therefore, compared to a case where traveling vehicle body side surface lines Lvs each are displayed as an inclined line, positional relationship between a lateral object and each traveling vehicle body side surface is easily understood.

Embodiment 4

A configuration in which an image illustrated in FIG. 7 is displayed on monitor 3 may be employed.

Control apparatus 2 of this embodiment performs viewpoint conversion processes for images IL, IR photographed with cameras 1L, 1R to generate viewpoint-converted images as viewed immediately downward from a leading end of boom 105. Furthermore, right and left viewpoint-converted images are composited, and one image It is generated. Known methods can be used for the viewpoint conversion process and the image composite process.

Control apparatus 2 overlaps positional information of boom 105 on viewpoint-converted image It to display the positional information. In this embodiment, the positional information of boom 105 is boom leading end line Lbf that indicates boom leading end position BF, and boom side surface lines Lbs that indicate boom side surface positions BS. Silhouette S of boom leading end portion 106 may be displayed.

In viewpoint-converted image It, boom leading end line Lbf is displayed as a horizontal line. Therefore, compared to a case where boom leading end line Lbf is displayed as an inclined line, a degree of protrusion of boom leading end portion 106 with respect to a lower object is easily understood.

In viewpoint-converted image It, boom side surface lines Lbs are displayed as vertical lines. Therefore, compared to a case where boom side surface lines Lbs are displayed as inclined lines, positional relationship between a lower object and each boom side surface is easily understood.

Control apparatus 2 overlaps positional information of traveling vehicle body 101 on viewpoint-converted image It to display the positional information. The positional information of traveling vehicle body 101 in this embodiment is traveling vehicle body side surface lines Lvs that indicate traveling vehicle body side surface positions VS.

Traveling vehicle body side surface lines Lvs in viewpoint-converted image It are each displayed as a vertical line. Therefore, compared to a case where traveling vehicle body side surface lines Lvs are displayed as inclined lines, positional relationship between a lower object and each traveling vehicle body side surface is easily understood.

Other Embodiment

Although boom leading end line Lbf, boom side surface lines Lbs, silhouettes S of boom leading end portion 106 are exemplified as the "positional information of the boom" in each of the above embodiments, the present invention is not limited to this. The position of boom 105 may be displayed in various ways.

Although traveling vehicle body side surface lines Lvs are exemplified as the "positional information of the traveling vehicle body" in each of the above embodiments, the present invention is not limited to this. The positional information of traveling vehicle body 101 may be displayed in various ways.

The number of cameras is not limited to two, and one camera may be used, or three or more cameras may be used. Like PTL 1, a camera may be used on one of the right and left sides, and a side view mirror may be used on the other side. Additionally, both the right and left sides of boom leading end portion 106 may be photographed with one wide angle camera.

REFERENCE SIGNS LIST

A Surroundings display apparatus
1L, 1R Camera
2 Control apparatus
3 Monitor

The invention claimed is:

1. A surroundings display apparatus for a mobile crane comprising a traveling vehicle body, and a boom, the surroundings display apparatus for a mobile crane further comprising:
   a camera that is provided in a leading end portion of the boom;
   a control apparatus that is connected to the camera; and
   a monitor that is connected to the control apparatus,
   wherein the control apparatus overlaps positional information of the boom and positional information of the traveling vehicle body on an image photographed with the camera to display the positional information on the monitor, and
   wherein the positional information of the traveling vehicle body is a line that indicates a side surface position of the traveling vehicle body.

2. The surroundings display apparatus for a mobile crane according to claim 1, wherein,
   the positional information of the boom is a line that indicates a leading end position of the boom.

3. The surroundings display apparatus for a mobile crane according to claim 1, wherein,
   the positional information of the boom is a line that indicates a side surface position of the boom.

4. The surroundings display apparatus for a mobile crane according to claim 1, wherein,
   the positional information of the boom is a silhouette of a projection of the leading end portion of the boom.

5. The surroundings display apparatus for a mobile crane according to claim 1, wherein,
   the control apparatus performs a viewpoint conversion process on the image photographed with the camera to generate a viewpoint-converted image as viewed immediately downward from the leading end portion of the boom, and overlaps the positional information of the boom on the viewpoint-converted image to display the positional information on the monitor.

6. The surroundings display apparatus for a mobile crane according to claim 1, wherein,
   the camera is composed of a right camera provided in the leading end portion of the boom so as to face toward a right side, and a left camera provided in the leading end portion of the boom so as to face toward a left side, and
   the control apparatus displays respective images photographed with the right camera and the left camera on the monitor.

7. A surroundings display apparatus for a mobile crane comprising a traveling vehicle body, and a boom, the surroundings display apparatus for a mobile crane further comprising:
   a camera that is provided in a leading end portion of the boom;
   a control apparatus that is connected to the camera; and
   a monitor that is connected to the control apparatus,
   wherein the control apparatus overlaps positional information of the boom on an image photographed with the camera to display the positional information on the monitor, and
   wherein the control apparatus performs a viewpoint conversion process on the image photographed with the camera to generate a viewpoint-converted image as viewed immediately sideways from the leading end portion of the boom, and overlaps the positional information of the boom on the viewpoint-converted image to display the positional information on the monitor.

8. The surroundings display apparatus for a mobile crane according to claim 7, wherein,
   the positional information of the boom is a line that indicates a leading end position of the boom.

9. The surroundings display apparatus for a mobile crane according to claim 7, wherein,
   the positional information of the boom is a line that indicates a side surface position of the boom.

10. The surroundings display apparatus for a mobile crane according to claim 7, wherein,
    the positional information of the boom is a silhouette of a projection of the leading end portion of the boom.

11. The surroundings display apparatus for a mobile crane according to claim 7, wherein,
    the control apparatus performs a viewpoint conversion process on the image photographed with the camera to generate a viewpoint-converted image as viewed immediately downward from the leading end portion of the boom, and overlaps the positional information of the boom on the viewpoint-converted image to display the positional information on the monitor.

12. The surroundings display apparatus for a mobile crane according to claim 7, wherein,
    the camera is composed of a right camera provided in the leading end portion of the boom so as to face toward a right side, and a left camera provided in the leading end portion of the boom so as to face toward a left side, and
    the control apparatus displays respective images photographed with the right camera and the left camera on the monitor.

* * * * *